United States Patent
Patel

(10) Patent No.: US 10,019,964 B1
(45) Date of Patent: Jul. 10, 2018

(54) POWERING DOWN OF HEAD MOUNTED DISPLAY BASED ON MAGNETIC SENSOR DETECTION

(71) Applicant: Oculus VR, LLC, Menlo Park, CA (US)

(72) Inventor: Nirav Rajendra Patel, San Francisco, CA (US)

(73) Assignee: Oculus VR, LLC, Menlo Park, CA (US)

( * ) Notice: Subject to any disclaimer, the term of this patent is extended or adjusted under 35 U.S.C. 154(b) by 55 days.

(21) Appl. No.: 15/403,012

(22) Filed: Jan. 10, 2017

(51) Int. Cl.
| | |
|---|---|
| *G09G 5/00* | (2006.01) |
| *B65D 25/02* | (2006.01) |
| *B65D 43/02* | (2006.01) |
| *G01B 7/14* | (2006.01) |

(52) U.S. Cl.
CPC ............. *G09G 5/003* (2013.01); *B65D 25/02* (2013.01); *B65D 43/02* (2013.01); *G01B 7/14* (2013.01); *G09G 2330/026* (2013.01); *G09G 2330/027* (2013.01)

(58) Field of Classification Search
None
See application file for complete search history.

(56) References Cited

U.S. PATENT DOCUMENTS

| | | | | |
|---|---|---|---|---|
| 2016/0062454 A1* | 3/2016 | Wang | ..................... | G09G 5/003 345/633 |
| 2016/0140887 A1* | 5/2016 | Kim | ....................... | G09G 3/003 345/690 |

\* cited by examiner

*Primary Examiner* — Nicholas J Lee
*Assistant Examiner* — Duane N Taylor, Jr.
(74) *Attorney, Agent, or Firm* — Fenwick & West LLP

(57) ABSTRACT

A head mounted display (HMD) includes a magnetic sensor to produce a sensor signal responsive to detecting a magnet within a first threshold distance. The HMD also includes a circuit operatively coupled to the magnetic sensor. The circuit determines that the HMD is to be placed in a storage mode responsive to receiving the sensor signal from the magnetic sensor. The circuit powers down components of the HMD responsive to determining that the HMD is to be placed in the storage mode.

14 Claims, 4 Drawing Sheets

POWERING DOWN OF HEAD MOUNTED DISPLAY BASED ON MAGNETIC SENSOR DETECTION

BACKGROUND

Field of the Disclosure

The present disclosure generally relates to a head mounted display, and specifically to powering down of such head mounted display based on magnetic sensor detection.

Description of the Related Arts

Virtual reality (VR) systems typically include electronic display panels that present virtual reality images. For example a VR system may include a head mounted display (HMD) that includes an electronic display panel to present VR images to a user. An HMD may include a proximity sensor that detects when the user has put the HMD on. Once the proximity sensor senses that the user has worn the HMD, the electronic display panel turns on. On the other hand, if the proximity sensor senses that the user has taken off the HMD, the electronic display panel is turned off to conserve energy.

HMDs may be stored in cases when not in use. Alternatively, an HMD may include a strap that is worn by a user to secure the HMD on the user's head. When the HMD is not in use, the strap may be packed into an opening on the HMD's housing or wrapped around the HMD. However, the proximity sensor may detect objects such as the case or strap approaching the HMD when the HMD is not in use, thereby causing the electronic display panel to turn on and consume power unnecessarily.

SUMMARY

Embodiments relate to powering down an HMD by using a magnetic sensor of the HMD. The magnetic sensor detects a magnet that may be located in a storage case or a strap of the HMD. When the magnetic sensor detects placing of the HMD in the storage case or folding of the strap based on the proximity of the magnet, the HMD is powered down, In one embodiment, the HMD includes a magnetic sensor to produce a sensor signal responsive to detecting a magnet within a first threshold distance. The HMD includes a circuit operatively coupled to the magnetic sensor. The circuit determines that the HMD is to be placed in a storage mode responsive to receiving the sensor signal from the magnetic sensor and powers down components of the HMD responsive to determining that the HMD is to be placed in the storage mode.

In one embodiment, the magnetic sensor is a Hall Effect sensor, a fluxgate magnetometer, or a magnetoresistance sensor.

In one embodiment, the HMD includes a proximity sensor to produce a proximity signal responsive to detecting an object within a second threshold distance. The circuit is operatively coupled to the proximity sensor to receive the proximity signal. The circuit powers on the components responsive to receiving the proximity signal but not the sensor signal.

In one embodiment, the HMD includes a strap with the magnet. The strap secures the HMD to a user's head when the HMD is being used.

In one embodiment, the magnet is included in a storage case for storing the HMD.

In one embodiment, the HMD includes at least another magnetic sensor at a location different from the magnetic sensor. The circuit determines whether the HMD is to be placed in the storage mode based on sensor signals from at least the other magnetic sensor.

In one embodiment, a storage case for storing the HMD includes enclosing walls defining space to receive the HMD for storage. The storage case includes a magnet attached to or embedded in the enclosing walls at a location so that a magnetic sensor of the HMD is within a threshold distance when the HMD is stored in the space. A circuit of the HMD powers down components in the HMD responsive to the magnetic sensor detecting the magnet within the threshold distance.

In one embodiment, the enclosing walls of the storage case include four side walls, a floor and a removable lid. The magnet is attached to or embedded in one of the four side walls, the floor, or the lid.

BRIEF DESCRIPTION OF THE DRAWINGS

The teachings of the embodiments can be readily understood by considering the following detailed description in conjunction with the accompanying drawings.

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to an HMD having magnetic sensors to detect when the HMD is not in use and powering down the HMD when the HMD is not in use. When not in use, the HMD may be packed in a storage case, or a strap attached to a housing of the HMD may be collapsed into the HMD for storage. The magnetic sensor detects a magnet located in the storage case or on the strap and produces a sensor signal responsive to detecting the magnet. When the magnetic sensor detects the magnet in its proximity, the HMD powers down to reduce power consumption.

Example Schematic Perspective View of HMD and Storage Case

Figure 1:
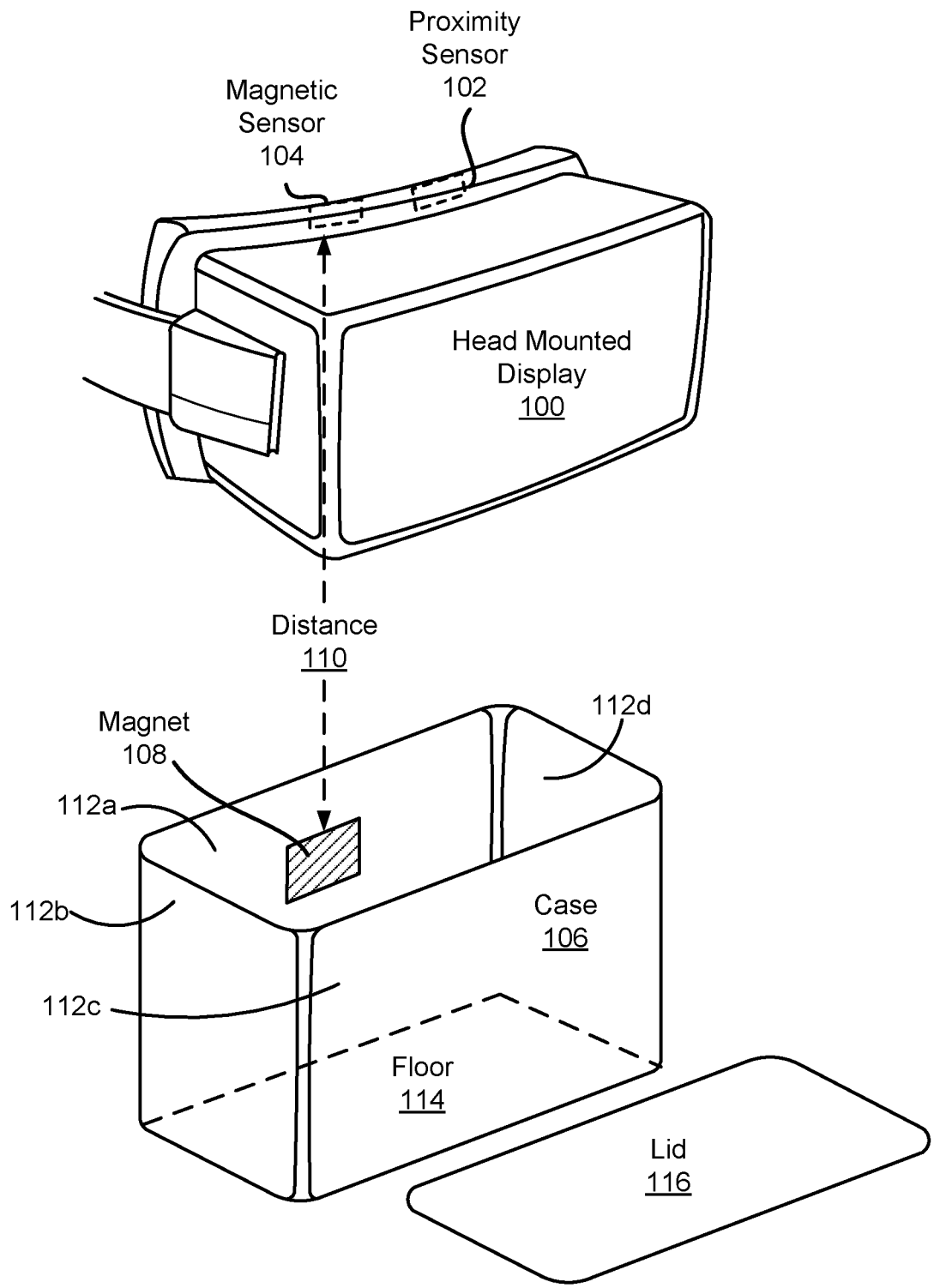
FIG. 1 is an example schematic perspective view of an HMD and a storage case, in accordance with an embodiment.

FIG. 1 is an example schematic perspective view of an HMD 100 and a storage case 106 for storing the HMD 100, in accordance with an embodiment. VR systems typically include user interface devices such as the HMD 100 to communicate with a controller or a computing device. The HMD 100 is a display device, worn on a user's head or as part of a helmet that has an electronic display panel in front of the user's eyes to display computer-generated imagery (CGI) or live imagery from the physical world. The electronic display panel is attached to a housing of the HMD 100.

The HMD 100 includes a proximity sensor 102 located on or within the housing of the HMD 100. The proximity sensor 102 produces a proximity signal responsive to detecting an object, such as the user's head, located within a threshold distance from the proximity sensor 102. The proximity sensor 102 detects when a user has put the HMD 100 on to power on the electronic display panel. The proximity sensor may be a capacitive sensor, a photoelectric sensor, an inductive proximity sensor, etc.

The HMD 100 may be stored in the storage case 106 along with accessories such as headphones, gaming controllers, cameras, etc. If a user places the HMD 100 in the storage case 106, the proximity sensor 102 may detect the surface of the storage case 106. As a result of such detection, the HMD 100 may falsely detect that the user is currently using the HMD 100, and hence, turn on components of the HMD 100 (e.g., display panel). Such unnecessary powering on of the HMD may lead to waste of power.

To alleviate or prevent waste of power in such circumstances, a magnetic sensor 104 is provided in the HMD 100. The magnetic sensor 104 produces a sensor signal responsive to detecting a magnet 108 located on or within the storage case 106 when a distance 110 between the magnetic sensor 104 and the magnet 108 is less than a threshold distance d. The magnet 108 is located in the storage case 106 such that the distance between the storage case 106 and the HMD 100 is less than the threshold distance d when the HMD 100 is placed within the case 106. In this way, unnecessary power consumption, heat generation, and battery drainage for the HMD 100 is reduced or prevented when placed in the storage case 106 for storage.

The storage case 106 for storing the HMD 100 includes enclosing walls, e.g., 112a, defining space to receive the HMD 100 for storage as illustrated in FIG. 1. The enclosing walls may be made of materials such as impact-resistant plastic with internal foam cushioning to protect the HMD 100 from impacts and drops. The storage case 106 includes the magnet 108 attached to or embedded in the enclosing walls at a location so that the magnetic sensor 104 of the HMD 100 is within the threshold distance d when the HMD 100 is stored in the space. The enclosing walls of the storage case 106 include four side walls 112 (112a, 112b, 112c, and 112d), a floor 114, and a removable lid 116. The magnet 108 is attached to or embedded in one of the four side walls 112, the floor 114, or the lid 116 of the storage case. In FIG. 1, the lid 116 is shown removed from the storage case 106. When the HMD 100 is stored in the storage case 106, the lid may be placed or secured on top of the storage case 106 to close the storage case 106.

The magnetic sensor 104 may be a Hall Effect sensor. A Hall Effect sensor is a linear transducer that varies its voltage output in response to sensing a magnetic field. The distance 110 from the Hall Effect sensor 104 to the magnet 108 may be determined from a voltage output signal of the Hall Effect sensor 104. The magnetic sensor 104 may be a fluxgate magnetometer. A fluxgate magnetometer is made of a magnetically susceptible core wrapped by two coils of wire. When the fluxgate magnetometer 104 is located near the magnet 108 and exposed to its magnetic field, a current in an output coil of the fluxgate magnetometer 104 may be integrated to yield a voltage output signal indicating the distance 110 from the fluxgate magnetometer 104 to the magnet 108. The magnetic sensor 104 may be a magnetoresistance sensor that changes the value of its electrical resistance in an externally-applied magnetic field. The change in resistance of the magnetoresistance sensor 104 may be measured as a voltage output signal indicating the distance 110 from the magnetoresistance sensor 104 to the magnet 108.

When the distance 110 between the magnetic sensor 104 and the magnet 108 is less than the threshold distance d, meaning the magnetic sensor 104 senses that the HMD 100 has been placed in the case 106, the magnetic sensor 104 produces the sensor signal responsive to detecting the magnet 108. The signal may be a voltage output as described above. Alternatively, the magnetic sensor 104 may produce a sensor signal in the form of an electric current using an op-amp to convert the voltage output to the electric current signal.

The HMD 100 includes an electric circuit operatively coupled to the magnetic sensor 104 and connected to components of the HMD 100 (e.g., the electronic display panel). The electric circuit receives from the magnetic sensor 104 the sensor signal indicating whether the magnet 108 is located within the threshold distance d from the magnetic sensor 104, determines that the HMD 100 is to be placed in a storage mode responsive to receiving the sensor signal from the magnetic sensor 104 and powers down the components of the HMD 100 responsive to determining that the HMD 100 is to be placed in the storage mode, as described below in detail with reference to FIG. 3. The circuit is also operatively coupled to the proximity sensor 102 to receive the proximity signal. The circuit powers on the components of the HMD 100 responsive to receiving the proximity signal but not the sensor signal.

In some embodiments, the HMD 100 may include more than one magnetic sensor and the storage case 106 may include more than one magnet. The HMD 100 may include at least another magnetic sensor at a location different from the magnetic sensor 104. The circuit determines whether the HMD 100 is to be placed in the storage mode based on sensor signals from at least the other magnetic sensor.

Example Strap of Head Mounted Display with Magnet

Figure 2:
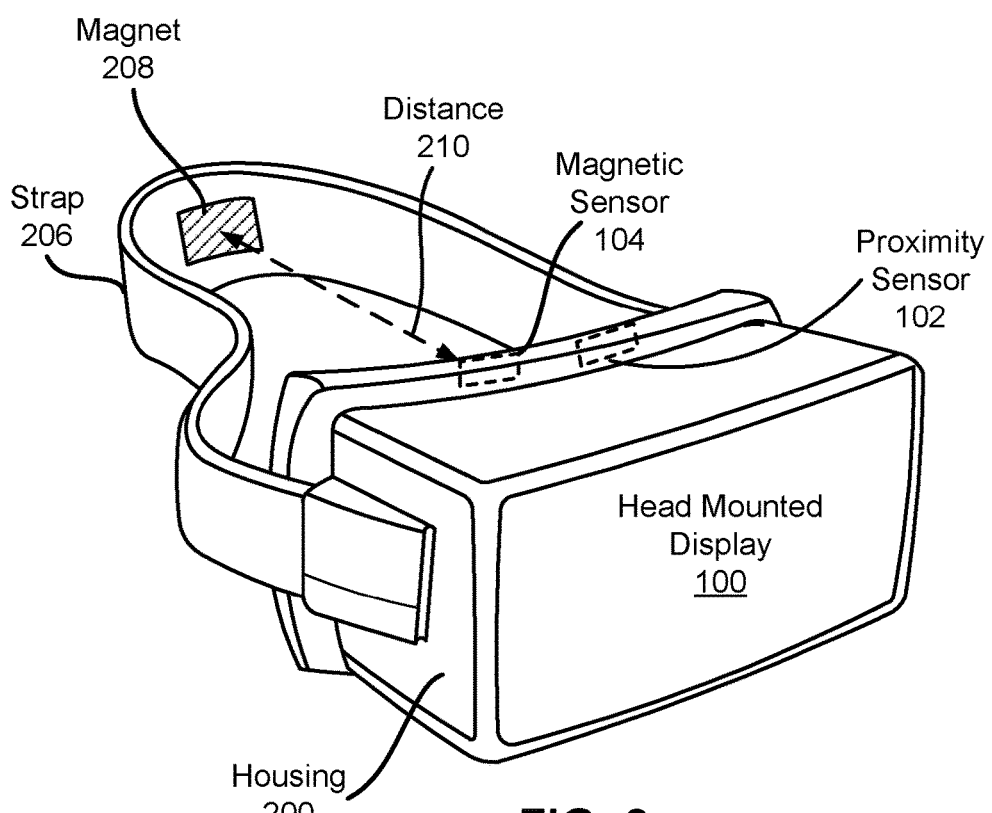
FIG. 2 is an example schematic perspective view of an HMD having a strap with a magnetic sensor, in accordance with an embodiment.

FIG. 2 is an example schematic perspective view of an HMD 100 having a strap 206, in accordance with an embodiment. The strap 206 is attached to a housing 200 of the HMD 100. The strap 206 may be worn by a user to secure the HMD 100 on the user's head. The strap 206 shown in FIG. 2 may include a flexible segment made of a stretchable band and a semi-rigid segment to conform to a portion of the user's head. When not in use, the strap 206 may be rolled up, bunched up, or otherwise collapsed into an opening in the HMD 100. When not in use, the strap 206 may also be wrapped around the HMD 100 for storage.

The HMD 100 shown in FIG. 2 includes a proximity sensor 102, as described in detail above with reference to FIG. 1. The proximity sensor 102 is located on or within the housing 200 of the HMD 100 and detects when a user has put the HMD 100 on to automatically power on the electronic display panel. However, the proximity sensor 102 may falsely detect that the HMD 100 is in use when the strap 206 is rolled up, bunched up or otherwise collapsed into the opening in the HMD 100, or wrapped around the HMD 100, thereby causing the HMD 100 to turn on its components unnecessarily.

The HMD 100 in FIG. 2 also includes a magnetic sensor 104 located on or within the housing 200 of the HMD 100, as described above with reference to FIG. 1. The magnetic sensor 104 of FIG. 2 functions in the same way as the magnetic sensor 104 of FIG. 1 except that the magnetic sensor 104 of FIG. 2 detects the magnet 208 in the strap 206.

Example Sensors and Circuit for Power Down Operation

Figure 3:
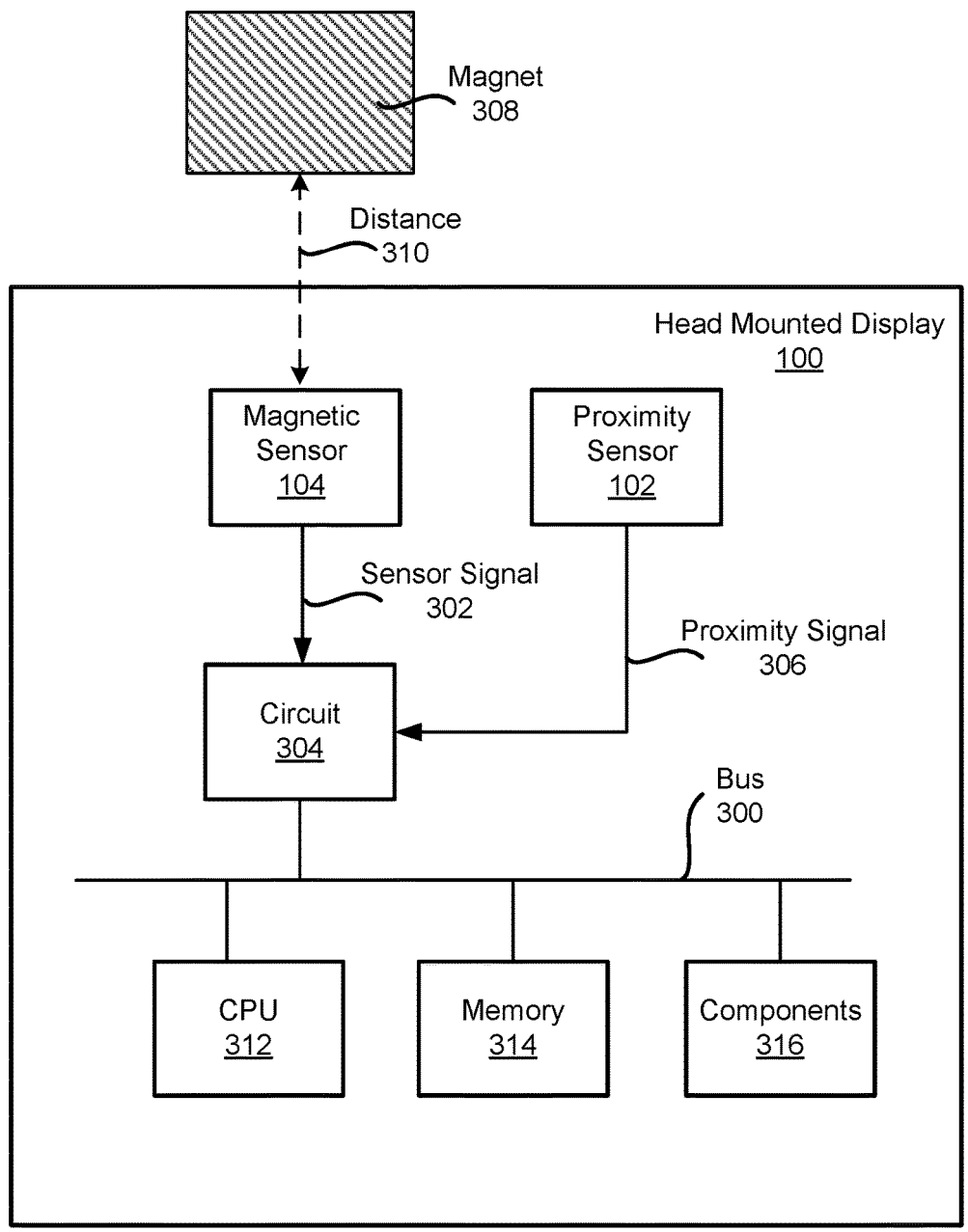
FIG. 3 is an example schematic block diagram of an HMD, in accordance with an embodiment.

FIG. 3 is an example schematic block diagram of the HMD 100 interacting with a magnet 308, in accordance with an embodiment. The HMD 100 may include, among other components, a proximity sensor 102, a magnetic sensor 104, an electric circuit 304, a central processing unit (CPU) 312, a memory 314, and other components 316 (e.g., a display panel). The proximity sensor 102 is located on or within a housing of the HMD 100 to detect when a user has put the HMD 100 on. When the proximity sensor 102 detects that the user has put the HMD 100 on, it produces a proximity signal 306. The circuit 304 is operatively coupled to the proximity sensor 102 to receive the proximity signal 306. The circuit 304 powers on the components 316 of the HMD 100 responsive to receiving the proximity signal 306.

The magnet 308 shown in FIG. 3 may be located on or within the case 106 or the strap 206, as described in detail above with reference to FIGS. 1 and 2. The distance 310 is the distance between the magnet 308 and the magnetic sensor 104 in the HMD 100. The magnetic sensor 104 in the HMD 100 is configured to detect the magnet 308 when the distance 310 between the magnet 308 and the magnetic sensor 104 is less than a threshold distance d, and produce a sensor signal 302 responsive to detecting the magnet 308. The magnetic sensor 104 may be a Hall Effect sensor, a fluxgate magnetometer, or a magnetoresistance sensor, as described above in detail with reference to FIG. 1.

When the magnetic sensor 104 in the HMD 100 detects the magnet 308 located less than a threshold distance d from the magnetic sensor 104, it sends the sensor signal 302 to an electric circuit 304. The sensor signal may be an electric current or a voltage V. The electric circuit 304 is located within the housing of the HMD 100 and electrically connected to the components 316 by the bus 300. The electric circuit 304 receives the sensor signal 302 from the magnetic sensor 104, determines that the HMD 100 is to be placed in a storage mode responsive to receiving the sensor signal 302 from the magnetic sensor 104 and powers down the components 316 of the HMD 100 responsive to determining that the HMD 100 is to be placed in the storage mode. The electric circuit 304 may include a switch comparator op-amp to compare the voltage V signal 302 from the magnetic sensor 104 with a threshold voltage $V_T$. In embodiments, the electric circuit 304 receives the voltage V signal 302 from the magnetic sensor 104, and powers down the components 316 if the voltage V exceeds the threshold voltage $V_T$.

In embodiments, the electric circuit 304 may receive the sensor signal 302 from the magnetic sensor 104 in the form of an electric current. The electric circuit 304 may convert the electric current to a voltage by a sense resistor. The electric circuit 304 may further include a switch comparator op-amp to power down the components 316 if the voltage exceeds the threshold voltage $V_T$. In embodiments, the electric circuit 304 may receive the sensor signal 302 from the magnetic sensor 104 and communicate with the CPU 312 and memory 314 via the bus 300. The CPU 312 may power down the components 316 responsive to communicating with the circuit 304.

Example Process for Powering Down Electronic Display Panel

Figure 4:
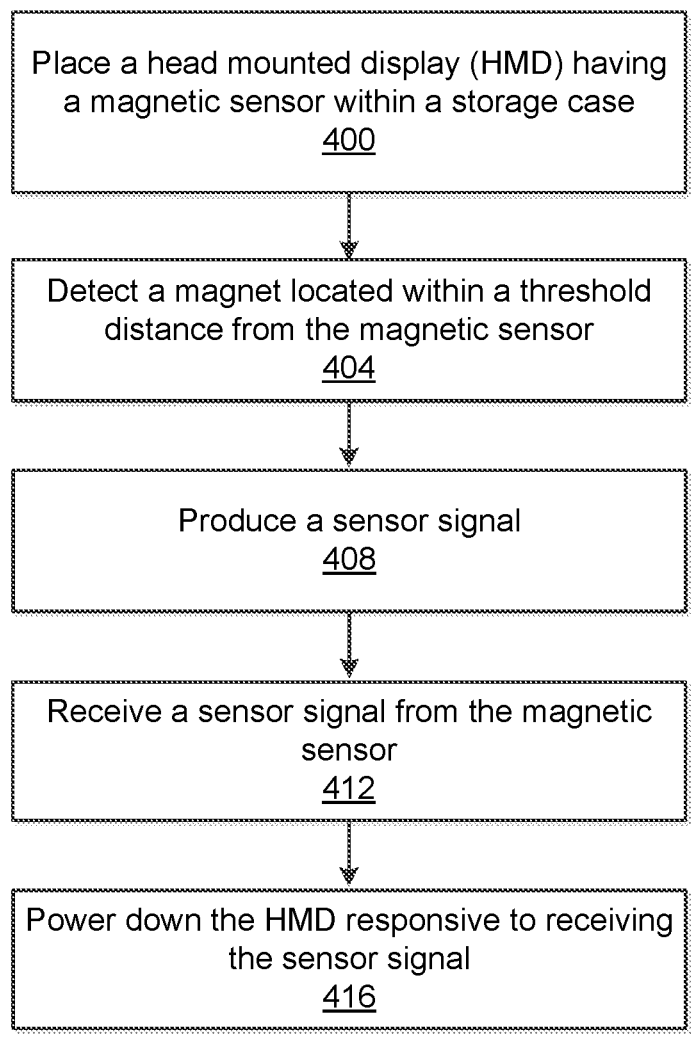
FIG. 4 is a flowchart illustrating an example process for powering down an HMD, in accordance with an embodiment.

FIG. 4 is a flowchart illustrating an example process for powering down components 316 of an HMD 100, in accordance with an embodiment. In some embodiments, the process may have different and/or additional steps than those described in conjunction with FIG. 4. Steps of the process may be performed in different orders than the order described in conjunction with FIG. 4. Some steps may be executed in parallel. Alternatively, some of the steps may be executed in parallel and some steps executed sequentially. Alternatively, some steps may execute in a pipelined fashion such that execution of a step is started before the execution of a previous step.

An HMD 100 having a magnetic sensor 104 located on or within a housing of the HMD 100 is placed 400 within a storage case 106. The magnetic sensor 104 detects 404 a magnet 108 in the storage case 106 located within a threshold distance d from the magnetic sensor 104. The magnetic sensor produces 408 a sensor signal 302 in the form of an output voltage or current, responsive to detecting the magnet 108 within the threshold distance d.

An electric circuit 304, operatively coupled to the magnetic sensor 104, receives 412 the sensor signal 302 from the magnetic sensor 104. The electric circuit 304, which may include a switch comparator, determines that the HMD 100 is to be placed in a storage mode responsive to receiving the sensor signal 302 from the magnetic sensor 104 and powers down the components 316 of the HMD 100 responsive to determining that the HMD 100 is to be placed in the storage mode.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A head mounted display (HMD) comprising:
a magnetic sensor configured to produce a sensor signal responsive to detecting a magnet within a first threshold distance; and
a circuit operatively coupled to the magnetic sensor, the circuit configured to determine that the HMD is to be placed in a storage mode responsive to receiving the sensor signal from the magnetic sensor and power down one or more components of the HMD responsive to determining that the HMD is to be placed in the storage mode.

2. The HMD of claim 1, wherein the magnetic sensor is a Hall Effect sensor, a fluxgate magnetometer, or a magnetoresistance sensor.

3. The HMD of claim 1, further comprising a proximity sensor configured to produce a proximity signal responsive to detecting an object within a second threshold distance, wherein the circuit is operatively coupled to the proximity sensor to receive the proximity signal, the circuit further configured to power on the one or more components responsive to receiving the proximity signal but not the sensor signal.

4. The HMD of claim 1, further comprising a strap with the magnet, the strap configured to secure the HMD to a user's head when the HMD is being used.

5. The HMD of claim 1, wherein the magnet is included in a storage case for storing the HMD.

6. The HMD of claim 1, further comprising at least another magnetic sensor at a location different from the magnetic sensor, the circuit configured to determine whether the HMD is to be placed in the storage mode based on sensor signals from at least the other magnetic sensor.

7. A storage case for storing a head mounted display (HMD), the storage case comprising:
  enclosing walls defining space to receive the HMD for storage; and
  a magnet attached to or embedded in the enclosing walls at a location so that a magnetic sensor of the HMD is within a threshold distance when the HMD is stored in the space, a circuit of the HMD powering down one or more components in the HMD responsive to the magnetic sensor detecting the magnet within the threshold distance.

8. The storage case of claim 7, wherein the enclosing walls include four side walls, a floor and a lid, and wherein the magnet is attached to or embedded in one of the four side walls, the floor, or the lid.

9. A method, comprising:
  producing a sensor signal, by a magnetic sensor, responsive to detecting a magnet within a first threshold distance; and
  responsive to receiving the sensor signal from the magnetic sensor by a circuit operatively coupled to the magnetic sensor, determining whether a head mounted display (HMD) is to be placed in a storage mode; and
  responsive to determining that the HMD is to be placed in the storage mode, powering down one or more components of the HMD.

10. The method of claim 9, wherein the magnetic sensor is a Hall Effect sensor, a fluxgate magnetometer, or a magnetoresistance sensor.

11. The method of claim 9, further comprising:
  producing a proximity signal, by a proximity sensor, responsive to detecting an object within a second threshold distance, wherein the circuit is operatively coupled to the proximity sensor to receive the proximity signal; and
  responsive to receiving the proximity signal but not the sensor signal, powering on the one or more components.

12. The method of claim 9, further comprising securing, by a strap with the magnet, the HMD to a user's head when the HMD is being used.

13. The method of claim 9, wherein the magnet is included in a storage case for storing the HMD.

14. The method of claim 9, further comprising:
  determining whether the HMD is to be placed in the storage mode, by the circuit, based on sensor signals from at least another magnetic sensor at a location different from the magnetic sensor.

* * * * *